Patented Apr. 9, 1946

2,398,317

UNITED STATES PATENT OFFICE 2,398,317

PROTEINACEOUS-QUATERNARY AMMONIUM SURFACE ACTIVE AGENTS AND PROCESS OF MAKING SAME

Charles A. MacKenzie, Upper Montclair, and Leonard Spialter, Irvington, N. J., assignors to Montclair Research Corporation, a corporation of New Jersey No Drawing. Application September 26, 1944, Serial No. 555,900

7 Claims. (Cl. 260—112)

This invention relates to surface-active substances prepared from partly degraded proteinaceous materials.

An object of the invention is the preparation of surface-active agents from naturally occurring protein materials such as gelatin, zein, soya bean meal, blood albumin, egg albumin and other proteins of animal or vegetable origin. A further object is the preparation of wetting agents from scrap protein materials such as fish scrap, leather scrap, silk waste, dried blood, horn, hair, feathers, etc. Another object is the preparation of the agents by an economical process involving a simple procedure with simple apparatus.

Protein materials may be split by treatment with acid or basic solutions. It is possible to control the cleavage so that a partly degraded product may be obtained. For example, a high molecular weight water-soluble material may be obtained by boiling protein material with dilute sodium hydroxide solution for about 5 to 30 minutes or longer. Since the product thus obtained contains reactive amino groups it may be combined with certain reagents that show reactivity toward these groups, for example, organic acid halides. If a halogen-substituted organic acid halide is used, such as chloroacetyl chloride, then a reactive chlorine will be introduced into the molecule. Various acid halides other than chloroacetyl chloride may be used. The acid halides may be bromoacetyl bromide, bromoacetyl chloride, alpha chloropropionyl chloride, beta chloropropionyl chloride, alpha bromobutyryl chloride, etc. Another type of organic acid halide comprises alkarylsulfonyl halides substituted in the alkyl group by halogen, such as chloromethylbenzenesulfonyl chloride.

When the above mentioned degraded protein is allowed to react with a halogen substituted acid halide and the mixture is subsequently neutralized and dried, a water-insoluble mass is obtained. The product thus obtained, which contains a halogenated acyl group, may be converted to a water-soluble form by heating it under anhydrous conditions with a tertiary amine. In this way water-soluble quaternary ammonium type salts are formed. These salts exhibit valuable detergent properties. As examples of tertiary amines we may use aliphatic amines such as triethylamine, mixed aliphatic-aromatic amines of the nature of dimethylaniline, or heterocyclic amines, for example, pyridine or quinoline.

Before or during addition of the haloacid halide to the degraded proteinaceous material of the present invention, the hydrophobic qualities may be increased by reacting part of the reactive amino groups with a long chain fatty acid halide, or aliphatic or aromatic sulfonyl halide, containing a long carbon chain, such as stearoyl chloride, lauroyl chloride, kerosyl sulfonyl chloride (mixed sulfonyl chlorides of the hydrocarbons of kerosene), butyl naphthalene sulfonyl chloride and the like. As an example, leather scrap may be degraded and the alkaline solution treated with amyl naphthalene sulfonyl chloride. This product is then treated with chloracetyl chloride and finally with a tertiary amine to give a soluble, foaming quaternary ammonium compound. In this way a quaternary ammonium derivative of a partially degraded protein is obtained which also contains groups from the fatty or sulfonic acid halide.

The following examples are illustrative of our invention.

*Example 1.*—Seven grams of zein was boiled for 5 minutes with 40 ml. of 10% NaOH solution. A clear, orange-colored solution of partially degraded zein was obtained. The solution was cooled to room temperature and 5 ml. of chloroacetyl chloride was added dropwise with stirring. The reaction was exothermic and some solid separated. The solution became acid so 10 ml. of 20% NaOH solution was added. The mixture was heated to effect solution, then cooled and neutralized with hydrochloric acid. The flask was then connected to a water-suction pump and heated to remove water. The resulting water-insoluble, resinous material was refluxed for 2 hours with 30 ml. of pyridine. There was obtained 7.0 grams of a pyridine-insoluble mass which, after removal of the excess pyridine, proved to be deliquescent and possessed of good sudsing qualities in water.

*Example 2.*—Seven grams of zein was boiled for 30 minutes with 40 ml. of 10% NaOH solution. The resulting clear orange solution was cooled and to it was added 15 ml. of 20% NaOH solution. Five ml. of chloroacetyl chloride was added with stirring and the mixture was allowed to cool to room temperature over a period of 30 minutes. The mixture was neutralized with 10% hydrochloric acid. Water was removed by heating the flask after connecting it to a water pump. The water-insoluble, brown, resinous material obtained was refluxed for 2 hours with 30 ml. of triethylamine. After removal of the excess trietylamine from the amine-insoluble mass, there was obtained, in good yield, a deliquescent solid which exhibited valuble detergent properties.

*Example 3.*—Seven grams of blood albumin was boiled for 15 minutes with 50 ml. of 10% NaOH solution. The solution was cooled to room temperature and 5 ml. of chloroacetyl chloride was added with stirring. After standing for ½ hour the mixture was neutralized with 10% hydrochoric acid and the water was removed by heat and suction. The solid obtained was refluxed with 30 ml. of dimethylaniline to yield an amine-insoluble dark, solid mass. The product obtained showed good wetting properties.

*Example 4.*—Seven grams of wool was boiled for 15 minutes with 30 ml. of 20% NaOH solution. The clear, dark-red solution obtained was cooled and to it, with stirring, was added 5 ml. of chloroacetyl chloride. The mixture, after standing for ½ hour, was neutralized with 5% hydrochloric acid solution. The brown, resinous solid obtained after removal of the water was refluxed for 2 hours with 30 ml. of diethyl aminoethanol. The amine-insoluble material obtained possessed good detergent properties.

*Example 5.*—Seven grams of gelatin was digested for 15 minutes with 30 ml. of 20% NaOH solution. The clear, light orange solution obtained was cooled and 5 ml. of chloroacetyl chloride was added dropwise with stirring. After standing ½ hour the mixture was neutralized with dilute hydrochloric acid. Following removal of the water there was obtained a light-brown flaky solid which was then heated for 2 hours at 130° C. with 35 ml. of diethyl benzyl-amine. The amine-insoluble product formed showed good detergent properties.

In the following example, a hydrophobic group, the stearoyl radical, is attached to the degraded protein molecule in addition to the choloracetyl group.

*Example 6.*—Five grams of zein was boiled with 20 ml. of 10% NaOH until solution was effected. When cool, a mixture of 1.5 ml. of stearoyl chloride and 1.5 ml. chloroacetyl chloride was then added dropwise with stirring. The reaction was exothermic, and after cooling for 30 minutes, the mixture was neutralized with dilute hydrochloric acid. The water was then removed with the aid of suction and heat. There remained 7 grams of a yellow-orange hard resinous-appearing material. This was refluxed for 90 minutes with pyridine. The brown tarry pyridine-insoluble material obtained was very soluble in water and sudsed well.

We claim:

1. A surface active composition comprising the reaction product of a tertiary amine with the neutralized and dried product of reaction between a partially degraded protein in aqueous alkali solution and a halogen-substituted organic acid halide.

2. The composition of claim 1 wherein the protein is zein.

3. The composition of claim 1 wherein the protein is blood albumin.

4. The composition of claim 1 wherein the protein is gelatin.

5. A surface active composition comprising the reaction product of a tertiary amine with the neutralized and dried product of reaction between a partially degraded protein in aqueous alkali solution and chloroacetyl chloride.

6. A surface active composition comprising the reaction product of pyridine with the neutralized and dried product of reaction between a partially degraded protein in aqueous alkali solution and a halogen-substituted organic acid halide.

7. The process of making a surface reactive composition which comprises allowing a halogen-substituted organic acid halide to react with a partially degraded protein in aqueous alkali solution, neutralizing the reaction mixture to obtain a water-insoluble partially degraded protein compound containing a halogen-substituted acyl group, removing water from the said protein compound and thereafter heating same at a refluxing temperature with a tertiary amine.

CHARLES A. MacKENZIE.
LEONARD SPIALTER.